(12) United States Patent
Kawakami et al.

(10) Patent No.: US 9,217,594 B2
(45) Date of Patent: Dec. 22, 2015

(54) METHOD OF CONTROLLING COOLING DEVICE

(75) Inventors: Yoshiaki Kawakami, Nagoya (JP); Yuki Jojima, Nagoya (JP); Eizo Takahashi, Chiryu (JP); Kousuke Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/348,697

(22) PCT Filed: Oct. 5, 2011

(86) PCT No.: PCT/JP2011/072964
§ 371 (c)(1),
(2), (4) Date: Mar. 31, 2014

(87) PCT Pub. No.: WO2013/051114
PCT Pub. Date: Apr. 11, 2013

(65) Prior Publication Data
US 2014/0238056 A1 Aug. 28, 2014

(51) Int. Cl.
| F25D 17/06 | (2006.01) |
| F25B 49/02 | (2006.01) |
| F25B 31/00 | (2006.01) |
| F25B 25/00 | (2006.01) |
| F25B 6/04 | (2006.01) |
| B60H 1/00 | (2006.01) |

(52) U.S. Cl.
CPC ............ *F25B 49/02* (2013.01); *B60H 1/00885* (2013.01); *F25B 25/00* (2013.01); *F25B 31/008* (2013.01); *B60H 2001/00949* (2013.01); *F25B 6/04* (2013.01); *F25B 2400/23* (2013.01)

(58) Field of Classification Search
CPC ........ F25B 2400/23; F25B 25/00; F25B 6/04; F25B 27/02; F25B 2600/2501; B60H 2001/00949; B60H 1/00885
See application file for complete search history.

(56) References Cited

U.S. PATENT DOCUMENTS

| 5,878,589 A * | 3/1999 | Tanaka et al. ................... 62/199 |
| 2005/0133215 A1 * | 6/2005 | Ziehr et al. ..................... 165/202 |
| 2006/0218952 A1 | 10/2006 | Nagae et al. |
| 2009/0314023 A1 * | 12/2009 | Labaste Mauhe et al. ...... 62/335 |

FOREIGN PATENT DOCUMENTS

| JP | A-8-207547 | 8/1996 |
| JP | A 11-337193 | 12/1999 |
| JP | A-2001-263859 | 9/2001 |

(Continued)

*Primary Examiner* — Cheryl J Tyler
*Assistant Examiner* — Elizabeth Martin
(74) *Attorney, Agent, or Firm* — Oliff PLC

(57) ABSTRACT

A method of controlling a cooling device capable of stably cooling a heat source is provided. A cooling device includes a first passage through which a coolant discharged from a compressor flows into a cooling unit for cooling EV equipment; a second passage through which the coolant is circulated between a heat exchanger and the cooling unit; a switching valve switching communication of the first passage and communication of the second passage; and a liquid storage container storing a liquid coolant condensed in the heat exchanger. The control method includes the steps of: increasing an amount of the liquid coolant stored in the liquid storage container; and switching the switching valve so as to block the first passage and allow communication of the second passage.

12 Claims, 8 Drawing Sheets

(56) References Cited

FOREIGN PATENT DOCUMENTS

| JP | A-2001-309506 | 11/2001 | |
| JP | 2005082066 A * | 3/2005 | ............... B60H 1/32 |
| JP | A-2005-82066 | 3/2005 | |
| JP | A-2005-90862 | 4/2005 | |
| JP | A-2006-275496 | 10/2006 | |
| JP | A-2006-290254 | 10/2006 | |
| JP | A-2007-69733 | 3/2007 | |

* cited by examiner

| MODE | COMPRESSOR 12 | FLOW RATE REGULATING VALVE 28 | VALVE 57 | VALVE 58 |
|---|---|---|---|---|
| AIR-CONDITIONER OPERATION MODE | OPERATED | ADJUSTED TO CAUSE SUFFICIENT COOLANT TO FLOW INTO COOLING UNIT 30 | FULLY OPENED | FULLY CLOSED |
| HEAT PIPE OPERATION MODE | STOPPED | FULLY CLOSED | FULLY CLOSED | FULLY OPENED |

METHOD OF CONTROLLING COOLING DEVICE

TECHNICAL FIELD

The present invention relates to a method of controlling a cooling device, and particularly to a method of controlling a cooling device cooling a heat source utilizing a vapor compression refrigeration cycle.

BACKGROUND ART

In recent years, as one of countermeasures against environmental problems, attention has been paid to a hybrid vehicle, a fuel cell vehicle, an electric vehicle, and the like running with driving force of a motor. In such vehicles, electric devices such as a motor, a generator, an inverter, a converter, and a battery generate heat by transmission and reception of electric power. Therefore, these electric devices need to be cooled. Accordingly, there is a proposed technique for cooling a heat-generating body utilizing a vapor compression refrigeration cycle used as an air-conditioning apparatus for a vehicle.

For example, Japanese Patent Laying-Open No. 2006-290254 (PTD 1) discloses a cooling system of a hybrid vehicle including a compressor capable of sucking and compressing a gas coolant; a main condenser that can be cooled by ambient air for condensing a high-pressure gas coolant; an evaporator capable of evaporating a low-temperature liquid coolant and cooling an object to be cooled; and pressure reducing means, in which a heat exchanger capable of absorbing heat from a motor and second pressure reducing means are connected in parallel to the pressure reducing means and the evaporator. Japanese Patent Laying-Open No. 2007-69733 (PTD 2) discloses a system for cooling a heat-generating body utilizing a coolant for an air-conditioning device. In the system, a heat exchanger for performing heat exchange with air-conditioning air and a heat exchanger for performing heat exchange with the heat-generating body are arranged in parallel on a coolant passage extending from an expansion valve to a compressor.

Japanese Patent Laying-Open No. 2005-90862 (PTD 3) discloses a cooling system, in which heat-generating body cooling means for cooling a heat-generating body is provided on a bypass passage bypassing a decompressor, an evaporator and a compressor in a refrigeration cycle for air-conditioning. Japanese Patent Laying-Open No. 2001-309506 (PTD 4) discloses a cooling system, in which a coolant of a vehicle air-conditioning refrigeration cycle device is circulated to a cooling member of an inverter circuit portion for performing a drive control of a vehicle running motor, thereby suppressing cooling of air-conditioning air flow by an evaporator of the vehicle air-conditioning refrigeration cycle device when cooling of the air-conditioning air flow is not required.

CITATION LIST

Patent Document

PTD 1: Japanese Patent Laying-Open No. 2006-290254
PTD 2: Japanese Patent Laying-Open No. 2007-69733
PTD 3: Japanese Patent Laying-Open No. 2005-90862
PTD 4: Japanese Patent Laying-Open No. 2001-309506

SUMMARY OF INVENTION

Technical Problem

According to the cooling device disclosed in each of PTDs 2 and 3, a cooling passage for cooling a heat source such as an electrical device is incorporated in the vapor compression refrigeration cycle. When the heat source is cooled, the coolant in a gas-liquid two-phase state that has passed through a decompressor is introduced into a coolant passage for cooling the heat source. When the flow rate of the liquid-phase coolant for cooling the heat source is decreased, there occurs a problem that the cooling performance for the heat source is deteriorated.

The present invention has been made in light of the above-described problems. A main object of the present invention is to provide a method of controlling a cooling device capable of cooling a heat source with stability.

Solution to Problem

A control method according to the present invention is a method of controlling a cooling device cooling a heat source. The cooling device includes a compressor for circulating a coolant; a heat exchanger performing heat exchange between the coolant and outside air; a cooling unit cooling the heat source using the coolant; a first passage through which the coolant discharged from the compressor flows into the cooling unit; a second passage through which the coolant is circulated between the heat exchanger and the cooling unit; a switching valve switching between communication of the first passage and communication of the second passage; and a liquid storage container storing the coolant in a liquid state condensed by the heat exchanger. The control method includes the steps of: increasing an amount of the coolant in the liquid state stored in the liquid storage container; and switching the switching valve to block the first passage and to allow communication of the second passage.

According to the above-described control method, preferably, the switching valve includes a first open-close valve switching between communication of the first passage and blocking of the first passage; and a second open-close valve switching between communication of the second passage and blocking of the second passage. The step of switching the switching valve includes the steps of closing the first open-close valve, stopping the compressor, and opening the second open-close valve.

According to the above-described control method, preferably, the cooling device further includes an expansion valve decompressing the coolant, and a second heat exchanger performing heat exchange between the coolant decompressed by the expansion valve and air-conditioning air. The step of increasing an amount of the coolant includes the step of decreasing an opening degree of the expansion valve.

According to the above-described control method, preferably, the expansion valve is a thermal expansion valve. The cooling device further includes an air-conditioning fan for supplying the air-conditioning air to the second heat exchanger. The step of decreasing an opening degree includes the step of decreasing a rotation speed of the air-conditioning fan.

According to the above-described control method, preferably, the cooling device further includes a third heat exchanger provided between the heat exchanger and the expansion valve, and performing heat exchange between the coolant and outside air.

According to the above-described control method, preferably, the cooling device includes an outside-air supplying fan for supplying the outside air to the heat exchanger. The step of increasing an amount of the coolant includes the step of increasing a rotation speed of the outside-air supplying fan.

Advantageous Effects of Invention

According to the cooling device of the present invention, since the flow rate of the coolant in the liquid-phase state flowing into the heat source can be ensured. Accordingly, deterioration in cooling ability for the heat source can be suppressed, thereby allowing stable cooling of the heat source.

DESCRIPTION OF EMBODIMENTS

Figure 1:
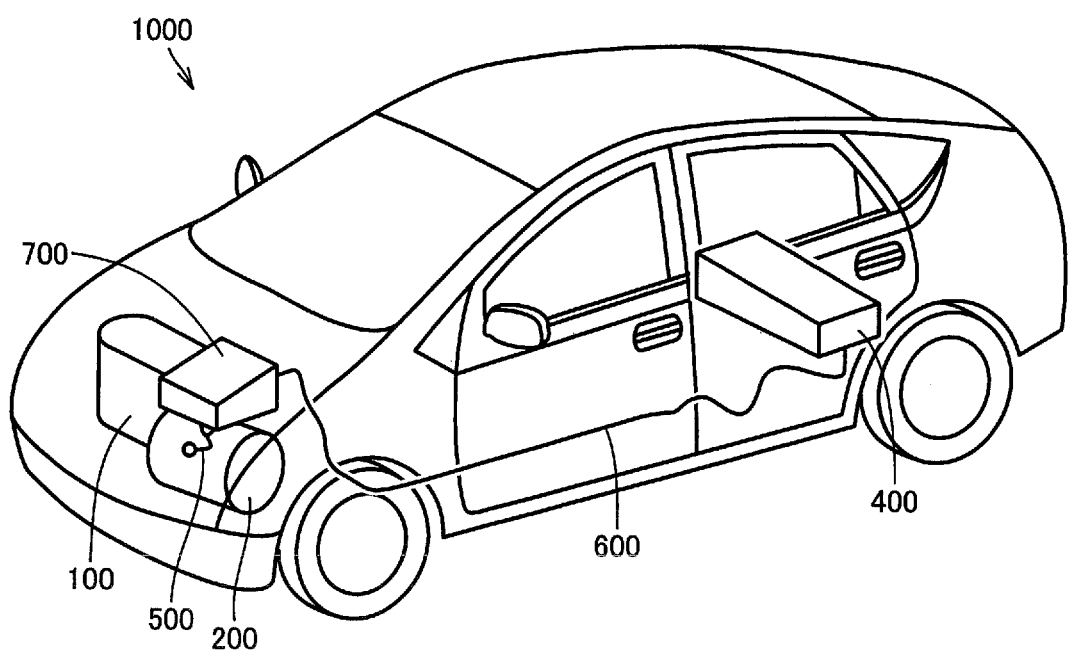
FIG. 1 is a schematic diagram showing the configuration of a vehicle to which a cooling device is applied.

The embodiments of the present invention will be hereinafter described with reference to the accompanying drawings, in which the same or corresponding components are designated by the same reference characters, and description thereof will not be repeated.

First Embodiment

FIG. 1 is a schematic diagram showing the configuration of a vehicle 1000 to which a cooling device 1 is applied. Vehicle 1000 according to the present embodiment is a hybrid vehicle configured to include an engine 100 serving as an internal combustion engine, a drive unit 200 serving as an electric motor, a PCU (Power Control Unit) 700, and a driving battery 400, and using engine 100 and drive unit 200 as a power source. In addition, cooling device 1 according to the present invention is applicable not only to a hybrid vehicle using an engine and an electric motor as a power source, but also to such a vehicle as using only an electric motor as a power source (both of which will be collectively herein referred to as an electric vehicle).

Engine 100 may be a gasoline engine or a diesel engine. Drive unit 200 generates driving force for driving vehicle 1000 together with engine 100. Engine 100 and drive unit 200 each are provided within an engine room of vehicle 1000. Drive unit 200 is electrically connected to PCU 700 through a cable 500. Furthermore, PCU 700 is electrically connected to driving battery 400 through a cable 600.

Figure 2:
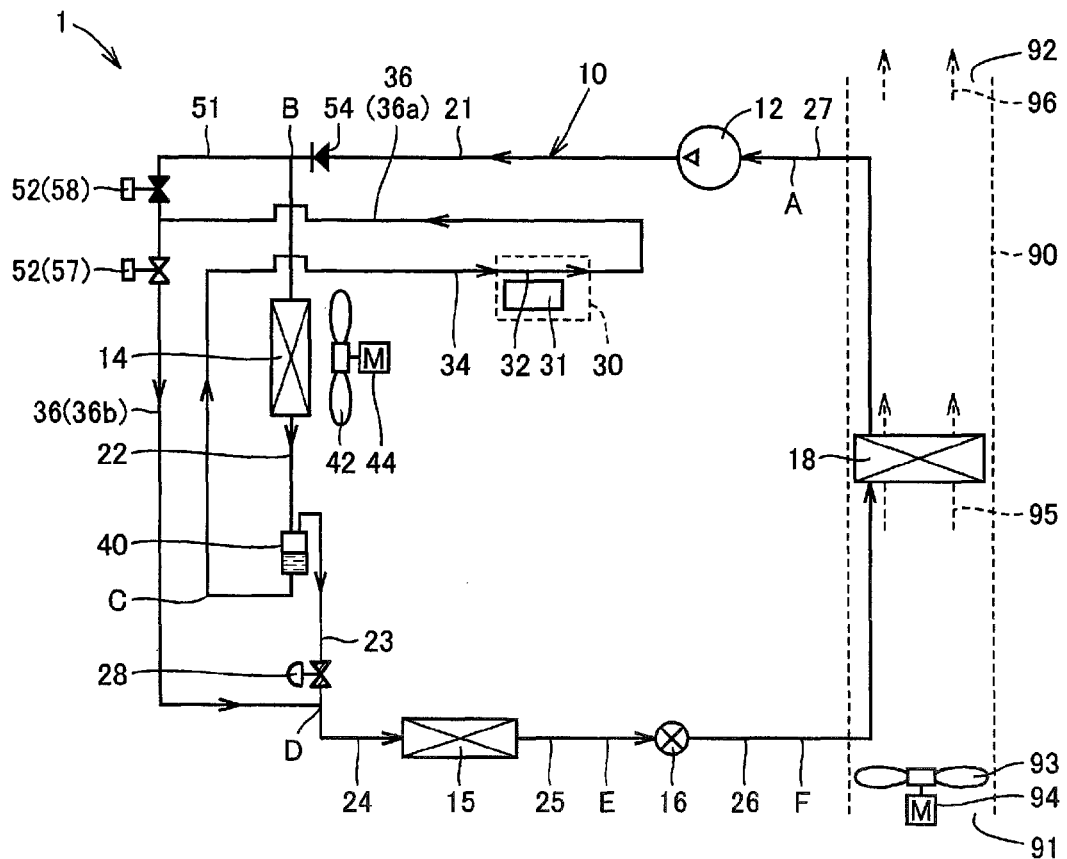
FIG. 2 is a schematic diagram showing the configuration of a cooling device according to the first embodiment.

FIG. 2 is a schematic diagram showing the configuration of cooling device 1 according to the first embodiment. As shown in FIG. 2, cooling device 1 includes a vapor compression refrigeration cycle 10. Vapor compression refrigeration cycle 10 is mounted on vehicle 1000, for example, to perform cooling in a vehicle cabin. The cooling with use of vapor compression refrigeration cycle 10 is performed, for example, when a switch for performing cooling is turned on, or when an automatic control mode for automatically adjusting the temperature in the vehicle cabin at a set temperature is selected and the temperature in the vehicle cabin is higher than the set temperature.

Vapor compression refrigeration cycle 10 includes a compressor 12, a heat exchanger 14 as the first heat exchanger, a heat exchanger 15 as the third heat exchanger, an expansion valve 16 as an example of a decompressor, and a heat exchanger 18 as the second heat exchanger. Vapor compression refrigeration cycle 10 also includes a gas-liquid separator 40 arranged on the route of the coolant between heat exchanger 14 and heat exchanger 15.

Compressor 12 is operated by a motor or an engine mounted on a vehicle as a power source and adiabatically compresses the coolant gas to obtain superheated coolant gas. Compressor 12 takes in and compresses a coolant flowing from heat exchanger 18 during operation of vapor compression refrigeration cycle 10, and then discharges a high-temperature and high-pressure gas-phase coolant to coolant passage 21. Compressor 12 discharges the coolant to coolant passage 21 to allow circulation of the coolant through vapor compression refrigeration cycle 10.

Heat exchangers 14 and 15 allow superheated coolant gas compressed by compressor 12 to radiate heat isobarically to an external medium to obtain coolant liquid. The high-pressure gas-phase coolant discharged from compressor 12 is condensed (liquefied) by radiating heat to a periphery of heat exchangers 14 and 15 for cooling. Heat exchangers 14 and 15 each include a tube through which the coolant flows, and a fin for performing heat exchange between the coolant flowing through the tube and air around heat exchangers 14 and 15.

Heat exchangers 14 and 15 perform heat exchange between cooling air and the coolant. The cooling air may be supplied to heat exchangers 14 and 15 by natural draft generated by vehicle running. Alternatively, the cooling air may be supplied to heat exchangers 14 and 15 by forced draft from an outside-air supplying fan such as a condenser fan 42 or a radiator fan for cooling the engine. The heat exchange performed in heat exchangers 14 and 15 lowers the temperature of the coolant to liquefy the coolant.

Expansion valve 16 allows the high-pressure liquid-phase coolant flowing through coolant passage 25 to be sprayed from a small pore for expansion to achieve a low-temperature, low-pressure mist-like coolant. Expansion valve 16 decompresses the coolant liquid condensed by heat exchangers 14 and 15 to obtain moist vapor in a gas-liquid mixed state.

By evaporation of the mist-like coolant flowing through heat exchanger 18, this heat exchanger 18 absorbs heat of ambient air introduced so as to come in contact with heat exchanger 18. Heat exchanger 18 uses the coolant decompressed by expansion valve 16 to absorb heat of evaporation, caused when the moist vapor of the coolant is evaporated to become coolant gas, from air-conditioning air flowing into the vehicle cabin, so that the vehicle cabin is cooled. The air-conditioning air with a temperature lowered due to absorption of heat by heat exchanger 18 is returned again into the vehicle cabin, so that the vehicle cabin is cooled. In heat exchanger 18, the coolant absorbs heat from its surroundings and is then heated.

Heat exchanger 18 includes a tube through which the coolant flows, and a fin for performing heat exchange between the coolant flowing through the tube and the ambient air of heat exchanger 18. The coolant in the state of moist vapor flows through the tube. When flowing through the tube, the coolant is evaporated by absorbing heat of the air in the vehicle cabin via the fin as latent heat of evaporation, and then turned into superheated vapor by sensible heat. The evaporated coolant flows into compressor 12 via coolant passage 27. Compressor 12 compresses the coolant flowing from heat exchanger 18.

Vapor compression refrigeration cycle 10 further includes a coolant passage 21 allowing communication between compressor 12 and heat exchanger 14, coolant passages 22, 23 and 24 allowing communication between heat exchanger 14 and heat exchanger 15, a coolant passage 25 allowing communication between heat exchanger 15 and expansion valve 16, a coolant passage 26 allowing communication between expansion valve 16 and heat exchanger 18, and a coolant passage 27 allowing communication between heat exchanger 18 and compressor 12.

Coolant passage 21 is a passage for causing the coolant to flow from compressor 12 to heat exchanger 14. The coolant flows between compressor 12 and heat exchanger 14 from an outlet of compressor 12 toward an inlet of heat exchanger 14 via coolant passage 21. Coolant passages 22 to 25 each are a passage for causing the coolant to flow from heat exchanger 14 to expansion valve 16. The coolant flows between heat exchanger 14 and expansion valve 16 from an outlet of heat exchanger 14 toward an inlet of expansion valve 16 via coolant passages 22 to 25.

Coolant passage 26 is a passage for causing the coolant to flow from expansion valve 16 to heat exchanger 18. The coolant flows between expansion valve 16 and heat exchanger 18 from an outlet of expansion valve 16 to the inlet of heat exchanger 18 via coolant passage 26. Coolant passage 27 is a passage for causing the coolant to flow from heat exchanger 18 to compressor 12. The coolant flows between heat exchanger 18 and compressor 12 from the outlet of heat exchanger 18 to an inlet of compressor 12 via coolant passage 27.

Vapor compression refrigeration cycle 10 is configured by compressor 12, heat exchangers 14 and 15, expansion valve 16, and heat exchanger 18 coupled via coolant passages 21 to 27. In addition, the coolant used for vapor compression refrigeration cycle 10 may be carbon dioxide, hydrocarbon such as propane and isobutane, ammonia, fluorocarbons, water or the like, for example.

Gas-liquid separator 40 separates the coolant flowing out of heat exchanger 14 into a gas-phase coolant and a liquid-phase coolant. Gas-liquid separator 40 stores coolant liquid that is a liquid-phase coolant and coolant vapor that is a gas-phase coolant. Coolant passages 22 and 23 and coolant passage 34 are coupled to gas-liquid separator 40.

On the outlet side of heat exchanger 14, the coolant is in the state of moist vapor in the gas-liquid two-phase state where saturated liquid and saturated vapor are mixed. The coolant flowing out of heat exchanger 14 is supplied to gas-liquid separator 40 through coolant passage 22. The coolant in the gas-liquid two-phase state that flows through coolant passage 22 into gas-liquid separator 40 is separated within gas-liquid separator 40 into a gas phase and a liquid phase. Gas-liquid separator 40 separates the coolant condensed by heat exchanger 14 into coolant liquid in the liquid state and coolant vapor in the gaseous state, and temporarily stores them.

The separated coolant liquid flows through coolant passage 34 to the outside of gas-liquid separator 40. Coolant passage 34 has an end disposed in the liquid phase within gas-liquid separator 40 and forming an outlet for the liquid-phase coolant flowing out of gas-liquid separator 40. The separated coolant vapor flows through coolant passage 23 to the outside of gas-liquid separator 40. Coolant passage 23 has an end disposed in the gas phase within gas-liquid separator 40 and forming an outlet for the gas-phase coolant flowing out of gas-liquid separator 40. The gas-phase coolant vapor derived from gas-liquid separator 40 radiates heat into the ambient environment in heat exchanger 15 provided between heat exchanger 14 and expansion valve 16, thereby being cooled and condensed.

Within gas-liquid separator 40, the coolant liquid accumulates in the lower portion while the coolant vapor accumulates in the upper portion. Coolant passage 34 has an end through which the coolant liquid flows out of gas-liquid separator 40. This end is coupled to the bottom of gas-liquid separator 40. Only the coolant liquid is caused to flow from the bottom side of gas-liquid separator 40 through coolant passage 34 to the outside of gas-liquid separator 40. Coolant passage 23 has an end through which the coolant vapor flows out of gas-liquid separator 40. This end is coupled to the ceiling part of gas-liquid separator 40. Only the coolant vapor is caused to flow from the ceiling side of gas-liquid separator 40 through coolant passage 23 to the outside of gas-liquid separator 40. Consequently, gas-liquid separator 40 can reliably carry out separation between the gas-phase coolant and the liquid-phase coolant.

The route through which the coolant flows from the outlet of heat exchanger 14 toward the inlet of expansion valve 16 includes a coolant passage 22 extending from the outlet side of heat exchanger 14 to gas-liquid separator 40, a coolant passage 23 through which the coolant vapor flows out of gas-liquid separator 40 through flow rate regulating valve 28 described later, a coolant passage 24 coupled to the inlet side of heat exchanger 15, and a coolant passage 25 through which the coolant flows from the outlet side of heat exchanger 15 to expansion valve 16. Coolant passage 23 is a passage through which the gas-phase coolant separated in gas-liquid separator 40 flows.

The route of the coolant flowing between heat exchangers 14 and 15 further includes a coolant passage 34 allowing communication between gas-liquid separator 40 and cooling unit 30, and a coolant passage 36 allowing communication between cooling unit 30 and coolant passage 24. The coolant liquid flows from gas-liquid separator 40 through coolant passage 34 into cooling unit 30. The coolant having passed through cooling unit 30 flows through coolant passage 36 and returns to coolant passage 24. Cooling unit 30 is provided on the route of the coolant that flows from heat exchanger 14 toward heat exchanger 15.

A point D shown in FIG. 2 indicates a connection point of coolant passage 23, coolant passage 24 and coolant passage 36. Specifically, the D point indicates the end of coolant passage 23 on the downstream side (on the side close to heat exchanger 15), the end of coolant passage 24 on the upstream side (on the side close to heat exchanger 14), and the end of coolant passage 36 on the downstream side. Coolant passage 23 forms a part of the route extending from gas-liquid separator 40 to the D point, through which the coolant flows from gas-liquid separator 40 toward expansion valve 16.

Cooling device 1 includes a coolant route arranged in parallel with coolant passage 23, and cooling unit 30 is disposed on this coolant route. Cooling unit 30 is provided on one of a plurality of passages connected in parallel in the route of the coolant flowing from gas-liquid separator 40 toward heat exchanger 15 between heat exchanger 14 and expansion valve 16. Cooling unit 30 includes EV (Electric Vehicle) equipment 31 that is electrical equipment mounted in an electric vehicle, and a cooling passage 32 serving as a pipe line through which the coolant flows. EV equipment 31 is an example of the heat source. Cooling passage 32 has one end connected to coolant passage 34 and the other end connected to coolant passage 36.

The coolant route connected in parallel with coolant passage 23 between gas-liquid separator 40 and the D point shown in FIG. 2 includes coolant passage 34 on the upstream side of cooling unit 30 (on the side close to gas-liquid separator 40), cooling passage 32 included in cooling unit 30, and coolant passage 36 on the downstream side of cooling unit 30 (on the side close to heat exchanger 15). Coolant passage 34 is a passage through which the liquid-phase coolant flows from gas-liquid separator 40 to cooling unit 30. Coolant passage 36 is a passage through which the coolant flows from cooling unit 30 to the D point. The D point is a branch point between coolant passages 23, 24 and coolant passage 36.

The coolant liquid flowing out of gas-liquid separator 40 flows through coolant passage 34 toward cooling unit 30. The coolant flowing into cooling unit 30 and flowing through cooling passage 32 absorbs heat from EV equipment 31 as a heat source, to thereby cool EV equipment 31. Cooling unit 30 cools EV equipment 31 using the liquid-phase coolant that is separated in gas-liquid separator 40 and flows through coolant passage 34 into cooling passage 32. In cooling unit 30, heat exchange between the coolant flowing through cooling passage 32 and EV equipment 31 is performed, thereby cooling EV equipment 31 and heating the coolant. The coolant further flows from cooling unit 30 through coolant passage 36 toward the D point, and reaches heat exchanger 15 through coolant passage 24.

Cooling unit 30 is provided so as to have a structure that allows heat exchange between EV equipment 31 and the coolant to be performed in cooling passage 32. In the present embodiment, cooling unit 30 includes a cooling passage 32 that is, for example, formed to have an outer peripheral surface coming in direct contact with the housing of EV equipment 31. Cooling passage 32 has a portion that is adjacent to the housing of EV equipment 31. In this portion, it becomes possible to perform heat exchange between the coolant flowing through cooling passage 32 and EV equipment 31.

EV equipment 31 is directly connected to an outer peripheral surface of cooling passage 32 forming a part of the coolant route extending from heat exchanger 14 to head exchanger 15 in vapor compression refrigeration cycle 10. Thus, EV equipment 31 is cooled. Since EV equipment 31 is arranged on the outside of cooling passage 32, EV equipment 31 does not interfere with the flow of the coolant flowing through cooling passage 32. Therefore, since the pressure loss of vapor compression refrigeration cycle 10 does not increase, EV equipment 31 can be cooled without increasing the motive power of compressor 12.

Alternatively, cooling unit 30 may include an optional known heat pipe arranged between EV equipment 31 and cooling passage 32. In this case, EV equipment 31 is connected to the outer peripheral surface of cooling passage 32 via the heat pipe. This EV equipment 31 is cooled by heat transfer from EV equipment 31 through the heat pipe to cooling passage 32. EV equipment 31 is used as a heating unit of the heat pipe and cooling passage 32 is used as a cooling unit of the heat pipe, thereby raising the heat transfer efficiency between cooling passage 32 and EV equipment 31. Accordingly, the cooling efficiency for EV equipment 31 can be improved. For example, a wick-type heat pipe can be used.

Since the heat pipe can reliably transfer heat from EV equipment 31 to cooling passage 32, EV equipment 31 and cooling passage 32 may be spaced apart from each other, and cooling passage 32 does not have to be arranged in complicated manner for bringing cooling passage 32 into contact with EV equipment 31. Consequently, the degree of freedom in arrangement of EV equipment 31 can be improved.

HV equipment 31 includes electric equipment generating heat by supply and reception of electric power. The electric equipment includes, for example, at least any one of an inverter for converting direct-current (DC) power to alternate-current (AC) power, a motor generator as a rotating electric machine, a battery as a power storage device, a boost converter for boosting the voltage of the battery, a DC/DC converter for stepping down the voltage of the battery. The battery is, for example, a secondary battery such as a lithium ion battery or a nickel-metal hydride battery. In place of the battery, a capacitor may be employed.

Heat exchanger 18 is disposed within a duct 9 through which air flows. Heat exchanger 18 performs heat exchange between the coolant and the air-conditioning air flowing through duct 90 to adjust the temperature of the air-conditioning air. Duct 90 includes a duct inlet 91 serving as an inlet through which the air-conditioning air flows into duct 90 and a duct outlet 92 serving as an outlet through which the air-conditioning air flows out of duct 90. An air-conditioning fan 93 is disposed near duct inlet 91 within duct 90. A motor 94 for driving air-conditioning fan 93 to rotate is coupled to air-conditioning fan 93.

By driving air-conditioning fan 93, air flows through duct 90 to supply air into heat exchanger 18. When air-conditioning fan 93 operates, air-conditioning air flows through duct inlet 91 into duct 90. The air flowing into duct 90 may be outside air, or may be air within the vehicle cabin. An arrow 95 in FIG. 2 indicates the flow of the air-conditioning air that flows through heat exchanger 18 and is subjected to heat exchange with the coolant in vapor compression refrigeration cycle 10. During the cooling operation, the air-conditioning air is cooled in heat exchanger 18, and the coolant is heated by heat transferred from the air-conditioning air. An arrow 96 indicates the flow of the air-conditioning air that has a temperature adjusted by heat exchanger 18 and flows out of duct 90 through duct outlet 92.

The coolant passes through a coolant circulating flow passage including compressor 12, heat exchangers 14 and 15, expansion valve 16, and heat exchanger 18 sequentially connected by coolant passages 21 to 27, and circulates in vapor compression refrigeration cycle 10. The coolant flows through vapor compression refrigeration cycle 10 so as to sequentially pass through the points A, B, C, D, E, and F shown in FIG. 2. Thus, the coolant circulates through compressor 12, heat exchangers 14 and 15, expansion valve 16, and heat exchanger 18.

Figure 3:
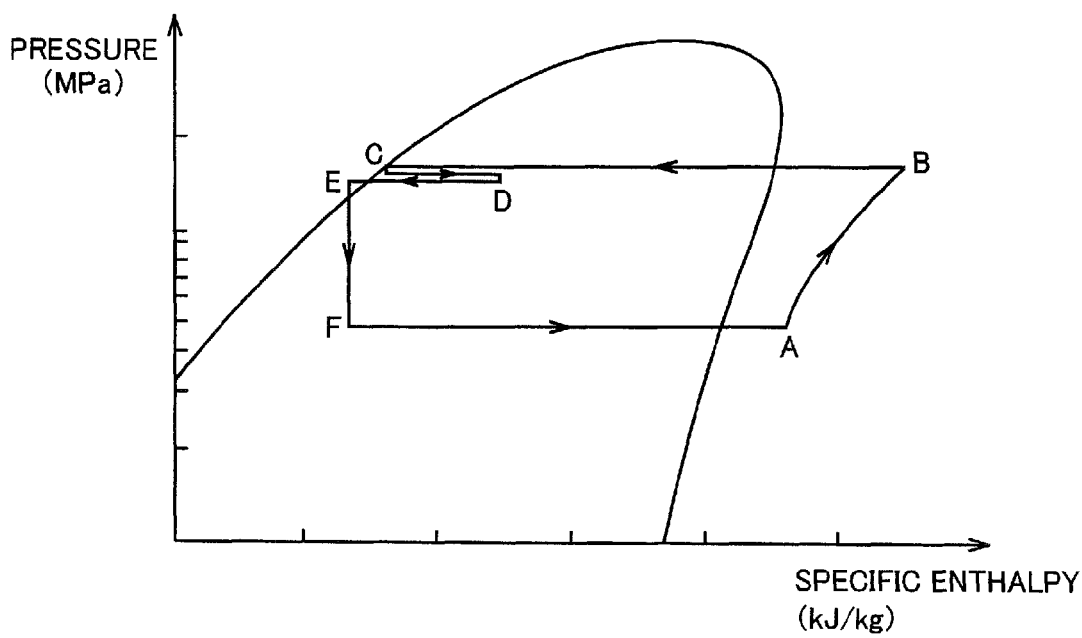
FIG. 3 is a Mollier chart showing the state of a coolant in a vapor compression-refrigeration cycle.

FIG. 3 is a Mollier chart showing the state of the coolant in vapor compression refrigeration cycle 10. In FIG. 3, the horizontal axis denotes a specific enthalpy of the coolant while the vertical axis denotes an absolute pressure of the coolant. The unit of the specific enthalpy is kJ/kg and the unit of the absolute pressure is MPa. The curve shown in the figure is a saturated vapor line and a saturated liquid line of the coolant.

FIG. 3 represents a thermal dynamic state of the coolant at each point (that is, points A, B, C, D, E and F) in vapor compression refrigeration cycle 10 that flows from coolant passage 22 at the outlet of heat exchanger 14 into coolant passage 34 via gas-liquid separator 40, cools EV equipment 31, and returns from coolant passage 36 to coolant passage 24 at the inlet of heat exchanger 15 via the D point. The route through which the coolant flows at this time, that is, coolant passages 21, 22, 34, 36, and 24 to 27, forms the first passage.

As shown in FIG. 3, the coolant in the superheated vapor state taken into compressor 12 (point A) is adiabatically compressed along an isentropic line in compressor 12. As the compression progresses, the coolant rises in pressure and temperature, turns into high-temperature and high-pressure superheated vapor with a high degree of superheat (point B), and flows into heat exchanger 14. The gas-phase coolant discharged from compressor 12 radiates heat into the ambient environment in heat exchanger 14, thereby being cooled and then condensed (liquefied). By heat exchange with the outside air in heat exchanger 14, the coolant is lowered in temperature and liquefied. The high-pressure coolant vapor having entered into heat exchanger 14 turns into dry saturated vapor from superheated vapor while maintaining equal pressure in heat exchanger 14, radiates latent heat of condensation and is gradually liquefied, and then, turns into moist vapor in the gas-liquid mixed state. Among the coolants in the gas-liquid two-phase state, the condensed coolant is in the saturated liquid state (C point).

The coolant is separated into a gas-phase coolant and a liquid-phase coolant in gas-liquid separator 40. Among the coolants separated into a gas-phase coolant and a liquid-phase coolant, the liquid-phase coolant liquid flows from gas-liquid separator 40 through coolant passage 34 into cooling passage 32 of cooling unit 30, to cool EV equipment 31. In cooling unit 30, heat is radiated into the liquid coolant that has passed through heat exchanger 14 and turned into a condensed saturated liquid state, thereby cooling EV equipment 31. By heat exchange with EV equipment 31, the coolant is heated to increase the dryness of the coolant. The coolant receives latent heat from EV equipment 31 and partially evaporates, thereby turning into moist vapor formed of a mixture of saturated liquid and saturated vapor (D point).

Then, the coolant flows into heat exchanger 15. The moist vapor of the coolant is cooled by heat exchange with outside air in heat exchanger 15 and thereby again condensed. When all the coolant is condensed, it turns into saturated liquid, and turns into supercooled liquid (E point) which has been supercooled by radiating sensible heat. Then, the coolant flows into expansion valve 16 through coolant passage 25. At expansion valve 16, the coolant in the supercooled liquid state is subjected to throttle expansion, and the temperature and pressure are lowered without a change in a specific enthalpy, so that low-temperature and low-pressure moist vapor in the gas-liquid mixed state is obtained (F point).

The coolant in the moist vapor state flowing out of expansion valve 16 flows into heat exchanger 18 through coolant passage 26. The coolant in the moist vapor state flows into the tube of heat exchanger 18. When flowing through the tube of heat exchanger 18, the coolant absorbs heat of the air in the vehicle cabin as latent heat of evaporation via the fin, thereby being evaporated while maintaining the equal pressure. When all the coolant turns into dry saturated vapor, the coolant vapor is further raised in temperature by sensible heat and turns into superheated vapor (A point). After that, the coolant is sucked into compressor 12 through coolant passage 27. Compressor 12 compresses the coolant flowed from heat exchanger 18.

In accordance with such a cycle, the coolant continuously repeats the state changes of compression, condensation, throttle expansion, and evaporation. In the description of the vapor compression refrigeration cycle set forth above, the theoretical refrigeration cycle is described. However, in actual vapor compression refrigeration cycle 10, loss in compressor 12, and pressure loss and heat loss in the coolant should be taken into consideration.

During the operation of vapor compression refrigeration cycle 10, the coolant absorbs heat of evaporation from the air in the vehicle cabin when it evaporates in heat exchanger 18 acting as an evaporator. Thereby, this coolant cools the vehicle cabin. In addition, the high-pressure liquid coolant, which has flowed out of heat exchanger 14 and has been separated into a gas-phase coolant and a liquid-phase coolant in gas-liquid separator 40, flows into cooling unit 30 and subjected to heat exchange with EV equipment 31, thereby cooling EV equipment 31. Utilizing vapor compression refrigeration cycle 10 for air conditioning in the vehicle cabin, cooling device 1 cools EV equipment 31 serving as a heat source mounted in the vehicle. It is desirable that the temperature required for cooling EV equipment 31 is at least lower than the upper limit value of the target temperature range as a temperature range of HV equipment 31.

Since EV equipment 31 is cooled utilizing vapor compression refrigeration cycle 10 provided for cooling a portion to be cooled in heat exchanger 18, there is no need to provide devices such as a dedicated water circulating pump or cooling fan for cooling EV equipment 31. Accordingly, since the configuration required for cooling device 1 of EV equipment 31 can be reduced and the device configuration can be simplified, the production cost for cooling device 1 can be reduced. Additionally, since there is no need to drive a power source such as a pump and a cooling fan for cooling EV equipment 31, the power consumption for driving the power source is not required. Therefore, the power consumption for cooling EV equipment 31 can be reduced.

In heat exchanger 14, the coolant only has to be cooled to the state of moist vapor. In this case, the coolant in the gas-liquid mixed state is separated by gas-liquid separator 40, and only the coolant liquid in the saturated liquid state is supplied to cooling unit 30. The coolant in the moist vapor state that has received latent heat of evaporation from EV equipment 31 and partially evaporated is cooled again in heat exchanger 15. The state of the coolant is changed at a constant temperature until the coolant in the moist vapor state is condensed and completely turned into saturated liquid. Heat exchanger 15 further supercools the liquid-phase coolant to the supercool degree required for cooling the vehicle cabin. Since the supercool degree of the coolant does not need to be excessively raised, the volumes of heat exchangers 14 and 15 can be decreased. Therefore, the cooling ability for the vehicle cabin can be ensured, and heat exchangers 14 and 15 can be reduced in size, so that cooling device 1 that is reduced in size and advantageous for vehicle installation can be achieved.

Coolant passage 23 forming a part of the route of the coolant flowing from the outlet of heat exchanger 14 toward the inlet of expansion valve 16 is provided between heat exchanger 14 and heat exchanger 15. As a route through which the coolant flows from gas-liquid separator 40 toward expansion valve 16, coolant passage 23 not extending through cooling unit 30 and coolant passages 34, 36 and cooling passage 32 serving as a route of the coolant flowing through cooling unit 30 to cool EV equipment 31 are arranged in parallel. The cooling system of EV equipment 31 including coolant passages 34 and 36 is connected in parallel with coolant passage 23. Accordingly, only a part of the coolant flowing out of heat exchanger 14 flows into cooling unit 30. The amount of the coolant required for cooling EV equipment 31 flows through cooling unit 30, and EV equipment 31 is appropriately cooled. Therefore, EV equipment 31 can be prevented from being supercooled.

The route of the coolant flowing from heat exchanger 14 directly into heat exchanger 15 and the route of the coolant flowing from heat exchanger 14 through cooling unit 30 into heat exchanger 15 are arranged in parallel, and only a part of the coolant flows through coolant passages 34 and 36, thereby allowing reduction in pressure loss caused when the coolant flows through the cooling system of EV equipment 31. Since all the coolant does not flow into cooling unit 30, it becomes possible to reduce the pressure loss associated with the coolant flowing through cooling unit 30. Accordingly, it becomes possible to reduce the power consumption required for operating compressor 12 for circulating the coolant.

When the low-temperature and low-pressure coolant having passed through expansion valve 16 is used for cooling EV equipment 31, the ability of heat exchanger 18 to cool the air in the vehicle cabin is decreased, thereby lowering the ability to cool the vehicle cabin. In contrast, according to cooling device 1 in the present embodiment, in vapor compression refrigeration cycle 10, the high-pressure coolant discharged from compressor 12 is condensed by both of heat exchanger 14 as the first condenser and heat exchanger 15 as the second condenser. Two heat exchangers 14 and 15 are arranged between compressor 12 and expansion valve 16. Cooling unit 30 cooling EV equipment 31 is disposed between heat exchanger 14 and heat exchanger 15. Heat exchanger 15 is disposed on the route of the coolant flowing from cooling unit 30 toward expansion valve 16.

The coolant heated by latent heat of evaporation received from EV equipment 31 is sufficiently cooled in heat exchanger 15, so that the coolant has a temperature and pressure at the outlet of expansion valve 16 that are essentially required for cooling the vehicle cabin. Accordingly, it becomes possible to sufficiently increase the amount of heat received from outside when the coolant evaporates in heat exchanger 18. In this way, by setting the heat radiation ability of heat exchanger 15 allowing sufficient cooling of the coolant, EV equipment 31 can be cooled without exerting an influence upon the ability to cool the air in the vehicle cabin. Therefore, both of the cooling ability for EV equipment 31 and the cooling ability for the vehicle cabin can be reliably ensured.

When cooling EV equipment 31, the coolant flowing from heat exchanger 14 into cooling unit 30 receives heat from EV equipment 31 and is then heated. When the coolant is heated in cooling unit 30 to a temperature equal to or higher than the saturated vapor temperature and the total amount of the coolant evaporates, the amount of heat exchange between the coolant and EV equipment 31 is decreased, thereby preventing efficient cooling of EV equipment 31 and also increasing the pressure loss caused when the coolant flows through a pipe line. Accordingly, it is desirable to sufficiently cool the coolant in heat exchanger 14 to such an extent that the total amount of the coolant does not evaporate after EV equipment 31 is cooled.

Specifically, the state of the coolant at the outlet of heat exchanger 14 is brought closer to the saturated liquid, and typically, the coolant is brought into the state on the saturated liquid line at the outlet of heat exchanger 14. As a result of allowing heat exchanger 14 to have an ability to sufficiently cool the coolant, the heat radiating ability of heat exchanger 14 to radiate heat from the coolant becomes higher than the heat radiating ability of heat exchanger 15. By sufficiently cooling the coolant in heat exchanger 14 having a relatively greater heat radiating ability, the coolant having received heat from EV equipment 31 can be maintained in the state of moist vapor, so that the reduction in the amount of heat exchange between the coolant and EV equipment 31 can be avoided. Therefore, EV equipment 31 can be cooled in a fully efficient manner. The coolant in the vapor moist state that has cooled EV equipment 31 is efficiently cooled again in heat exchanger 15, and cooled to the state of supercooled liquid to an extent slightly below the saturated temperature. Therefore, cooling device 1 can be provided that can ensure both the cooling ability for the vehicle cabin and the cooling ability for EV equipment 31.

The coolant in the gas-liquid two-phase state at the outlet of heat exchanger 14 is separated into a gas-phase coolant and a liquid-phase coolant within gas-liquid separator 40. The gas-phase coolant separated by gas-liquid separator 40 flows through coolant passages 23 and 24, and is directly supplied to heat exchanger 15. The liquid-phase coolant separated by gas-liquid separator 40 flows through coolant passage 34 and is supplied to cooling unit 30 for cooling EV equipment 31. This liquid-phase coolant is a coolant truly in a saturated liquid state without excess or deficiency. By extracting only the liquid-phase coolant from gas-liquid separator 40 and causing it to flow through cooling unit 30, EV equipment 31 can be cooled utilizing the ability of heat exchanger 14 to the utmost. Accordingly, cooling device 1 can be provided that allows improvement in the cooling ability for EV equipment 31.

The coolant in the saturated liquid state at the outlet of gas-liquid separator 40 is introduced into cooling passage 32 through which EV equipment 31 is cooled. Thereby, it becomes possible to minimize the coolant in the vapor-phase state among the coolants flowing through the cooling system of EV equipment 31 including coolant passages 34 and 36 and cooling passage 32. Accordingly, it can be suppressed that the flow velocity of the coolant vapor flowing through the cooling system of EV equipment 31 is raised to increase the pressure loss, thereby allowing reduction in power consumption of compressor 12 for flowing the coolant. Therefore, deterioration in performance of vapor compression refrigeration cycle 10 can be avoided.

The coolant liquid in the saturated liquid state is stored in gas-liquid separator 40. Gas-liquid separator 40 functions as a liquid storage container temporarily storing the coolant liquid in a liquid state. A prescribed amount of the coolant liquid is stored in gas-liquid separator 40, so that the flow rate of the coolant flowing from gas-liquid separator 40 into cooling unit 30 can be maintained also during load change. Gas-liquid separator 40 has a liquid reservoir function, serves as a buffer against load change and can absorb this load change. Therefore, the cooling performance for EV equipment 31 can be stabilized.

Referring back to FIG. 2, cooling device 1 includes a flow rate regulating valve 28. Flow rate regulating valve 28 is disposed in coolant passage 23 forming one of the passages connected in parallel in the route of the coolant flowing from heat exchanger 14 toward expansion valve 16. Flow rate regulating valve 28 changes its valve opening degree to increase or decrease the pressure loss of the coolant flowing through coolant passage 23, thereby arbitrarily adjusting the flow rate of the coolant flowing through coolant passage 23 and the flow rate of the coolant flowing through the cooling system of EV equipment 31 including cooling passage 32.

For example, when flow rate regulating valve 28 is fully closed to set its valve opening degree at 0%, the total amount of the coolant flowing out of heat exchanger 14 flows from gas-liquid separator 40 into coolant passage 34. If the valve opening degree of flow rate regulating valve 28 is increased, the coolant flowing from heat exchanger 14 into coolant passage 22 is to include a coolant increased in flow rate that flows through coolant passage 23 directly into heat exchanger 15, and a coolant decreased in flow rate that flows through coolant passage 34 into cooling passage 32 to cool EV equipment 31. If the valve opening degree of flow rate regulating valve 28 is decreased, the coolant flowing from heat exchanger 14 into coolant passage 22 is to include a coolant decreased in flow rate that flows through coolant passage 23 directly into heat exchanger 15, and a coolant increased in flow rate that flows through cooling passage 32 to cool EV equipment 31.

When the valve opening degree of flow rate regulating valve 28 is increased, the flow rate of the coolant cooling EV equipment 31 is decreased, thereby decreasing the cooling ability for EV equipment 31. When the valve opening degree of flow rate regulating valve 28 is decreased, the flow rate of the coolant cooling EV equipment 31 is increased, thereby improving the cooling ability for EV equipment 31. Since the amount of the coolant flowing through EV equipment 31 can be optimally adjusted by using flow rate regulating valve 28, supercooling of EV equipment 31 can be reliably prevented. In addition, both of the pressure loss associated with the coolant flowing through the cooling system of EV equipment 31 and the power consumption of compressor 12 for circulating the coolant can be reliably decreased.

Cooling device 1 further includes a communication passage 51. Communication passage 51 allows communication between coolant passage 21 through which the coolant flows between compressor 12 and heat exchangers 14, and coolant passage 36 on the downstream side of cooling unit 30 among coolant passages 34 and 36 through which the coolant flows through cooling unit 30. Coolant passage 36 is divided into two passages including a coolant passage 36a on the upstream side of the branch to communication passage 51 and a coolant passage 36b on the downstream side of the branch to communication passage 51.

Coolant passage 36 and communication passage 51 each are provided with a switching valve 52 for switching the communication state between communication passage 51 and each of coolant passages 21, 36. Switching valve 52 is switched to be opened or closed, thereby allowing or disallowing flow of the coolant flowing through communication passage 51. By switching the route of the coolant using switching valve 52, the coolant having cooled EV equipment 31 can flow through a route arbitrarily selected from routes including a route extending through coolant passages 36b and 24 to heat exchanger 15 and a route extending through communication passage 51 and coolant passage 21 to heat exchanger 14.

More specifically, two open-close valves 57 and 58 each are provided as switching valve 52. Switching valve 52 includes open-close valve 57 as the first open-close valve and open-close valve 58 as the second open-close valve. Open-close valve 57 is provided in coolant passage 36b, and switches between communication of coolant passage 36b and blocking of coolant passage 36b. By switching open-close valve 57 to be opened or closed, the communication state of the first passage including coolant passage 36b is switched. Open-close valve 58 is provided in communication passage 51 and switches between communication of communication passage 51 and blocking of communication passage 51. By switching open-close valve 58 to be opened or closed, the communication state of the second passage including communication passage 51 described later is switched.

During the cooling operation of vapor compression refrigeration cycle 10, open-close valve 57 is fully opened (the valve opening degree is 100%), open-close valve 58 is full closed (the valve opening degree is 0%) and the valve opening degree of flow rate regulating valve 28 is adjusted such that the coolant can sufficiently flow into cooling unit 30. Consequently, the coolant having cooled EV equipment 31 and flowing through coolant passage 36a can reliably flow through coolant passage 36b into heat exchanger 15.

On the other hand, while vapor compression refrigeration cycle 10 is stopped, open-close valve 58 is fully opened, open-close valve 57 is fully closed, and further, flow rate regulating valve 28 is fully closed. Consequently, a looped route can be formed, through which the coolant having cooled EV equipment 31 and flowing through coolant passage 36a flows through communication passage 51 into heat exchanger 14, to circulate the coolant between cooling unit 30 and heat exchanger 14 without passing through compressor 12.

Figure 4:
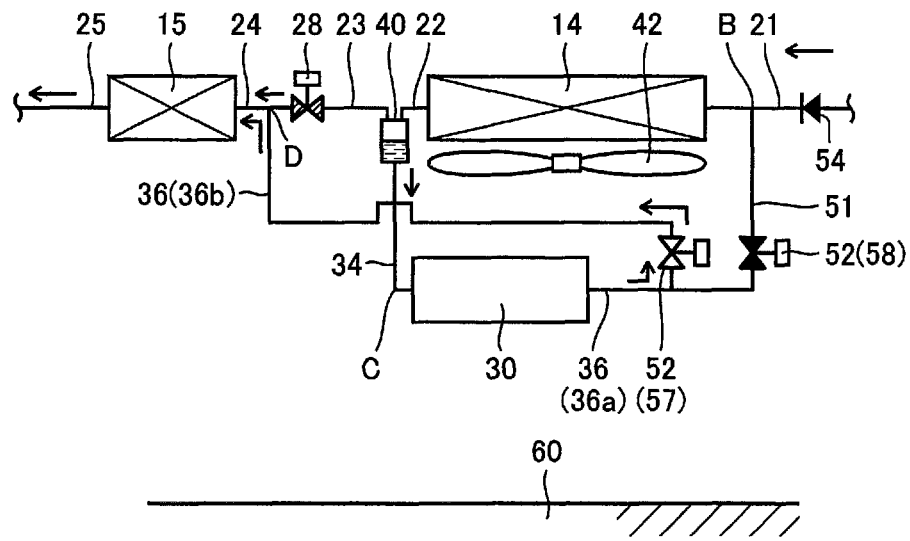
FIG. 4 is a schematic diagram showing the flow of the coolant cooling EV equipment during operation of the vapor compression refrigeration cycle.
Figure 5:
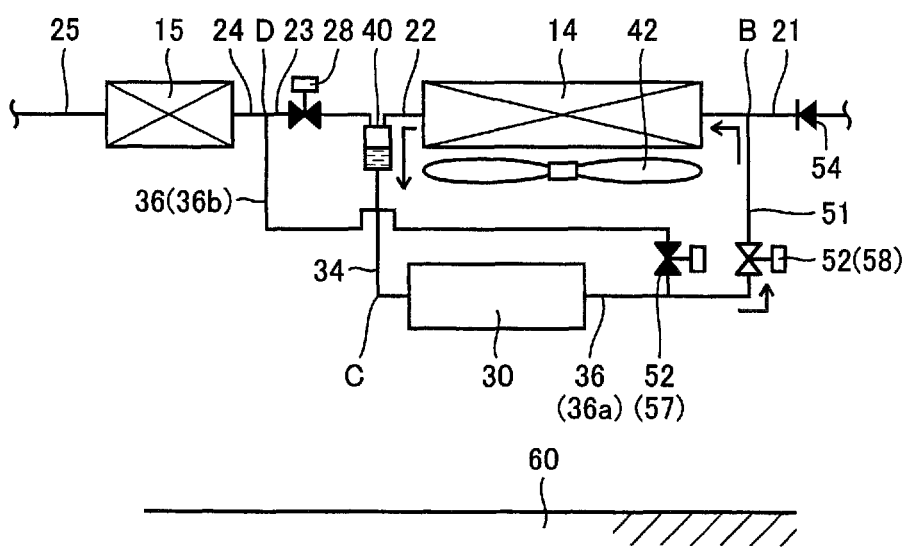
FIG. 5 is a schematic diagram showing the flow of the coolant cooling the EV equipment while the vapor compression refrigeration cycle is stopped.
Figures 6, 7:
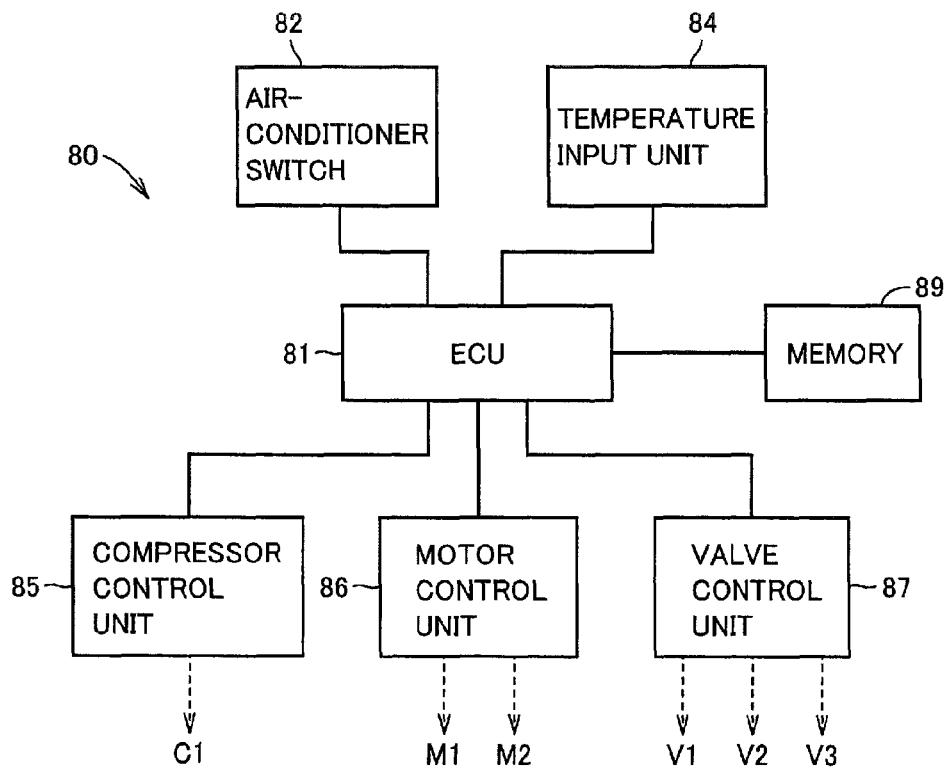
FIG. 6 is a diagram showing settings of a compressor, a flow rate regulating valve and an open-close valve for each operation mode of the cooling device.
FIG. 7 is a block diagram showing details of the configuration of a control unit.

FIG. 4 is a schematic diagram showing the flow of the coolant cooling EV equipment 31 during the operation of vapor compression refrigeration cycle 10. FIG. 5 is a schematic diagram showing the flow of the coolant cooling EV equipment 31 while vapor compression refrigeration cycle 10 is stopped. FIG. 6 is a diagram showing settings of compressor 12, flow rate regulating valve 28 and open-close valves 57 and 58 for each operation mode of cooling device 1. The "air-conditioner operation mode" of the operation modes shown in FIG. 6 represents the case where vapor compression refrigeration cycle 10 shown in FIG. 4 is operated, that is, the case where compressor 12 is operated to circulate the coolant through the entire vapor compression refrigeration cycle 10. The "heat pipe operation mode" represents the case where vapor compression refrigeration cycle 10 shown in FIG. 5 is stopped, that is, the case where compressor 12 is stopped to circulate the coolant through the looped route connecting cooling unit 30 and heat exchanger 14.

As shown in FIGS. 4 and 6, during the "air-conditioner operation mode" in which compressor 12 is driven and vapor compression refrigeration cycle 10 is operated, the valve opening degree of flow rate regulating valve 28 is adjusted such that sufficient coolant flows into cooling unit 30. Switching valve 52 is operated to cause the coolant to flow from cooling unit 30 through heat exchanger 15 into expansion valve 16. In other words, by fully opening open-close valve 57 and fully closing open-close valve 58, the route of the coolant is selected such that the coolant flows through the entire cooling device 1. Accordingly, the cooling ability of vapor compression refrigeration cycle 10 can be ensured while EV equipment 31 can be efficiently cooled.

As shown in FIGS. 5 and 6, during the "heat pipe operation mode" in which compressor 12 is stopped and vapor compression refrigeration cycle 10 is stopped, switching valve 52 is operated to cause the coolant to circulate from cooling unit 30 to heat exchanger 14. In other words, by fully closing open-close valve 57, fully opening open-close valve 58 and fully closing flow rate regulating valve 28, the coolant flows through communication passage 51 from coolant passage 36a without flowing into coolant passage 36b. Thereby, a closed looped route is formed that extends from heat exchanger 14 sequentially through coolant passage 22 and coolant passage 34 to cooling unit 30, and further, sequentially through coolant passage 36a, communication passage 51 and coolant passage 21 back to heat exchanger 14. The route through which the coolant flows at this time, that is, coolant passage 21, coolant passage 22, coolant passage 34, coolant passage 36a, and communication passage 51, forms the second passage.

Thus, the coolant can be circulated through this looped route between heat exchanger 14 and cooling unit 30 without operating compressor 12. When cooling EV equipment 31, the coolant evaporates with the latent heat of evaporation received from EV equipment 31. The coolant vapor evaporated by heat exchange with EV equipment 31 flows into heat exchanger 14 sequentially through coolant passage 36a, communication passage 51 and coolant passage 21. In heat exchanger 14, the coolant vapor is cooled and condensed by wind caused by vehicle running or draft from condenser fan 42 or the radiator fan for engine cooling. The coolant liquid liquefied in heat exchanger 14 returns to cooling unit 30 through coolant passages 22 and 34.

In this way, the looped route extending through cooling unit 30 and heat exchanger 14 forms a heat pipe including EV equipment 31 as a heating unit and heat exchanger 14 as a cooling unit. Therefore, when vapor compression refrigeration cycle 10 is stopped, that is, even when cooling for the vehicle is stopped, EV equipment 31 can be reliably cooled without having to start compressor 12. Since compressor 12 does not have to be always operated for cooling EV equipment 31, the power consumption of compressor 12 can be decreased to thereby allow improvement in fuel efficiency of the vehicle, and also allow extension of the operating life of compressor 12, so that the reliability of compressor 12 can be improved.

The occupant of an electric vehicle operates the control panel for air conditioning provided in the instrument panel in the forward part in the vehicle, to switch cooling of the vehicle cabin from ON to OFF. According to this operation, the operation mode of cooling device 1 for cooling EV equipment 31 is switched from the air-conditioner operation mode to the heat pipe operation mode. In other words, compressor 12 is stopped while open-close valve 57 is fully closed. Thereby, the first passage is blocked, through which the coolant discharged from compressor 12 flows into cooling unit 30 for cooling EV equipment 31. In addition, flow rate regulating valve 28 is fully closed while open-close valve 58 is fully opened. This allows communication of the second passage for circulating the coolant by natural circulation between heat exchanger 14 and cooling unit 30. Consequently, the coolant can be supplied to cooling unit 30 without flowing through compressor 12.

Switching valve 52 is switched to be opened or closed, thereby switching between communication of the first passage and communication of the second passage. Consequently, the operation mode of cooling device 1 for cooling EV equipment 31 is switched from the air-conditioner operation mode allowing communication of the first passage and blocking the second passage to the heat pipe operation mode blocking the first passage and allowing communication of the second passage. In this way, also in the state where compressor 12 is stopped, the ability of cooling device 1 to cool EV equipment 31 is maintained.

FIGS. 4 and 5 each show a ground surface 60. Cooling unit 30 is disposed below heat exchanger 14 as seen in the vertical direction perpendicular to ground surface 60. In the looped route through which the coolant circulates between heat exchanger 14 and cooling unit 30, cooling unit 30 is disposed in the lower portion while heat exchanger 14 is disposed in the upper portion. Heat exchanger 14 is disposed at the position higher than cooling unit 30.

In this case, the coolant vapor heated and evaporated in cooling unit 30 rises through the looped route and reaches heat exchanger 14. Then, this coolant vapor is cooled and condensed in heat exchanger 14, and turns into a liquid coolant, which then goes down through the looped route by the action of gravity, and returns to cooling unit 30. In other words, a thermosyphon-type heat pipe is formed of cooling unit 30, heat exchanger 14, and a coolant route connecting them (that is, the second passage). The heat transfer efficiency from EV equipment 31 to heat exchanger 14 can be improved by forming a heat pipe. Accordingly, even when vapor compression refrigeration cycle 10 is stopped, EV equipment 31 can be more efficiently cooled without applying motive power.

Cooling device 1 further includes a check valve 54. Check valve 54 is disposed in coolant passage 21 between compressor 12 and heat exchanger 14 on the side closer to compressor 12 than to the connection portion between coolant passage 21 and communication passage 51. Check valve 54 allows the coolant to flow from compressor 12 toward heat exchanger 14, but inhibits the coolant from flowing in the direction opposite thereto. In this way, it becomes possible to reliably form a closed-loop coolant route through which the coolant is circulated between heat exchanger 14 and cooling unit 30 during the heat pipe operation mode shown in FIG. 5.

If check valve 54 is not provided, the coolant may flow from communication passage 51 into coolant passage 21 on the compressor 12 side. By providing check valve 54, the flow of the coolant flowing from communication passage 51 toward compressor 12 can be reliably inhibited. Accordingly, the cooling ability for EV equipment 31 using a heat pipe formed by a looped coolant route can be prevented from decreasing while vapor compression refrigeration cycle 10 is stopped. Therefore, EV equipment 31 can be efficiently cooled also when cooling for the vehicle cabin is stopped.

Furthermore, when the amount of the coolant within the closed-loop coolant route becomes insufficient while vapor compression refrigeration cycle 10 is stopped, compressor 12 is operated only for a short time period, so that the coolant can be supplied through check valve 54 into the closed-loop route. Consequently, the amount of the coolant within the closed loop can be increased to increase the processing amount of heat exchange of the heat pipe. Therefore, since the amount of the coolant in the heat pipe can be ensured, it becomes possible to avoid insufficient cooling of EV equipment 31 resulting from shortage of the coolant amount.

As switching valve 52 switching the state of communication between communication passage 51 and each of coolant passages 21 and 36, a pair of open-close valves 57 and 58 described above may be used, or a three-way valve disposed at the branch between coolant passage 36 and communication passage 51 may be used. Open-close valves 57 and 58 can be inexpensive since each of the valves only has to have a simple structure allowing the coolant passage to be opened and closed. By using these two open-close valves 57 and 58, a relatively low-cost cooling device 1 can be provided. On the other hand, it is considered that the space required for arranging the three-way valve may be smaller than the space required for arranging two open-close valves 57 and 58. Thus, by using such a three-way valve, cooling device 1 can be provided that is further reduced in size and excellent in vehicle mountability.

In both of the cases where switching valve 52 includes two open-close valves 57 and 58 and where switching valve 52 is a three-way valve, EV equipment 31 can be efficiently cooled both when vapor compression refrigeration cycle 10 is operated and when vapor compression refrigeration cycle 10 is stopped. A three-way valve may be disposed as the first open-close valve at the branch between coolant passage 36 and communication passage 51, and a three-way valve may further be disposed as the second open-close valve at the branch between coolant passage 21 and communication passage 51. In this case, since the state of communication between communication passage 51 and coolant passage 21 can be switched more reliably, the flow of the coolant can be more reliably formed between coolant passage 21 and communication passage 51, or the flow of the coolant between coolant passage 21 and communication passage 51 can be blocked more reliably. The three-way valve disposed at the branch between coolant passage 21 and communication passage 51 can be set to be opened or closed such that the flow of the coolant from communication passage 51 toward compressor 12 is inhibited. Accordingly, check valve 54 can be omitted in this case.

Hereinafter described will control of cooling device 1 according to the present embodiment. FIG. 7 is a block diagram showing details of the configuration of a control unit 80. Control unit 80 shown in FIG. 7 includes an ECU (Electric Control Unit) 81 controlling cooling device 1. ECU 81 receives a signal from an air-conditioner switch 82 indicating that the air-conditioner is ON or OFF. Air-conditioner switch 82 is provided, for example, on the instrument panel in the forward part within the vehicle cabin. By the vehicle occupant operating air-conditioner switch 82, the air-conditioner is switched between ON and OFF to start or stop cooling the vehicle cabin.

ECU 81 receives a signal indicating a temperature from a temperature input unit 84. Temperature input unit 84 receives an input of the temperature of the coolant at the inlet and outlet of cooling unit 30 from the sensor detecting the temperatures of the coolant flowing into cooling unit 30 and the coolant flowing out of cooling unit 30. Temperature input unit 84 may also receive an input of the temperature of the outside air near cooling device 1 and the temperature of air-conditioning air that is adjusted by heat exchange in heat exchanger 18.

Control unit 80 also includes a compressor control unit 85 controlling compressor 12 to start and stop; a motor control unit 86 controlling the rotation speed of each of motors 44 and 94; and a valve control unit 87 controlling flow rate regulating valve 28 and open-close valves 57, 58 to open and close. Control unit 80 also includes a memory 89 such as an RAM (Random Access Memory) and an ROM (Read Only Memory). Cooling device 1 is controlled by ECU 81 executing various processes in accordance with the control program stored in memory 89.

Compressor control unit 85 receives a control instruction transmitted from ECU 81, and transmits a signal C1 to compressor 12 that instructs compressor 12 to be started or stopped. Valve control unit 87 receives a control instruction transmitted from ECU 81, transmits a signal V1 to flow rate regulating valve 28 that gives an instruction for the opening degree of flow rate regulating valve 28, transmits a signal V2 to open-close valve 57 that gives an instruction for setting open-close valve 57 to be opened or closed, and transmits a signal V3 to open-close valve 58 that gives an instruction for setting open-close valve 58 to be opened or closed. Motor control unit 86 receives a control instruction transmitted from ECU 81, transmits a signal M1 to motor 44 that gives an instruction for the rotation speed of motor 44, and transmits a signal M2 to motor 94 that gives an instruction for the rotation speed of motor 94.

Based on whether the air-conditioner is ON or OFF and based on various temperatures input into temperature input unit 84, ECU 81 controls start and discontinuation of the operation of compressor 12, the rotation speed of each of motors 44 and 94, the opening degree of flow rate regulating valve 28, and the setting for opening or closing switching valve 52. ECU 81 has a function as operation mode switching means for switching the operation mode of cooling device 1.

Motor 44 is coupled to condenser fan 42 and drives condenser fan 42 to rotate. When the rotation speed of motor 44 is changed, the amount of heat exchange in heat exchanger 14 between the coolant and outside air is controlled. When the rotation speed of motor 44 is increased to increase the rotation speed of condenser fan 42, the flow rate of the air supplied to heat exchanger 14 is increased and the amount of heat exchange in heat exchanger 14 between the coolant and the outside air is increased. Consequently, the coolant cooling ability of heat exchanger 14 is improved. When the rotation speed of motor 44 is decreased to lower the rotation speed of condenser fan 42, the flow rate of the air supplied to heat exchanger 14 is decreased and the amount of heat exchange in heat exchanger 14 between the coolant and the outside air is decreased. Consequently, the coolant cooling ability of heat exchanger 14 is decreased.

When the rotation speed of motor 94 is changed, the amount of heat exchange in heat exchanger 18 between the coolant and air-conditioning air is controlled. When the rotation speed of motor 94 is increased to increase the rotation speed of air-conditioning fan 93, the flow rate of the air-conditioning air supplied to heat exchanger 18 is increased and the amount of heat exchange in heat exchanger 18 between the coolant and the air-conditioning air is increased. Consequently, the cooling ability for cooling the air-conditioning air by heat exchanger 18 is improved. When the rotation speed of motor 94 is decreased to decrease the rotation speed of air-conditioning fan 93, the flow rate of the air-conditioning air supplied to heat exchanger 18 is decreased and the amount of heat exchange in heat exchanger 18 between the coolant and the air-conditioning air is decreased. Consequently, the cooling ability in heat exchanger 18 is decreased.

Figure 8:
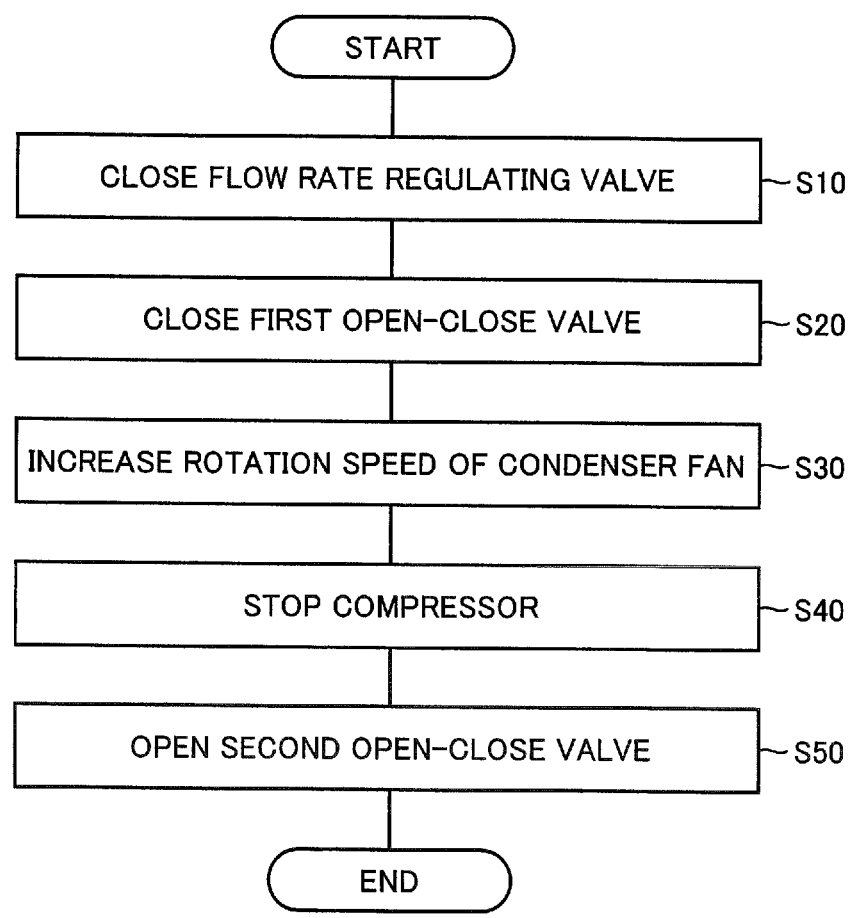
FIG. 8 is a flowchart illustrating an example of a method of controlling the cooling device.

FIG. 8 is a flowchart illustrating an example of a method of controlling cooling device 1. FIG. 8 shows an example of the control flow at the time when the operation mode of cooling device 1 is switched from the air-conditioner operation mode to the heat pipe operation mode.

As shown in FIG. 8, flow rate regulating valve 28 is first closed in step (S10). By setting the opening degree of flow rate regulating valve 28 at 0%, the coolant does not flow through coolant passage 23. This prevents the coolant condensed in heat exchanger 14 from flowing through coolant passage 23. The coolant condensed in heat exchanger 14 is stored in gas-liquid separator 40. All the coolant flowing out of gas-liquid separator 40 flows through coolant passage 34 toward cooling unit 30.

Then, in step (S20), open-close valve 57 is closed. At this time, the opening degree of each of open-close valve 57 and open-close valve 58 is set at 0%, and the route of the coolant between cooling unit 30 and heat exchanger 15 is blocked. Accordingly, the flow of the coolant flowing from cooling unit 30 toward heat exchanger 15 is stopped. While the coolant having been subjected to heat exchange with EV equipment 31 in cooling unit 30 does not flow into heat exchanger 18, compressor 12 continuously operates.

Figure 9:
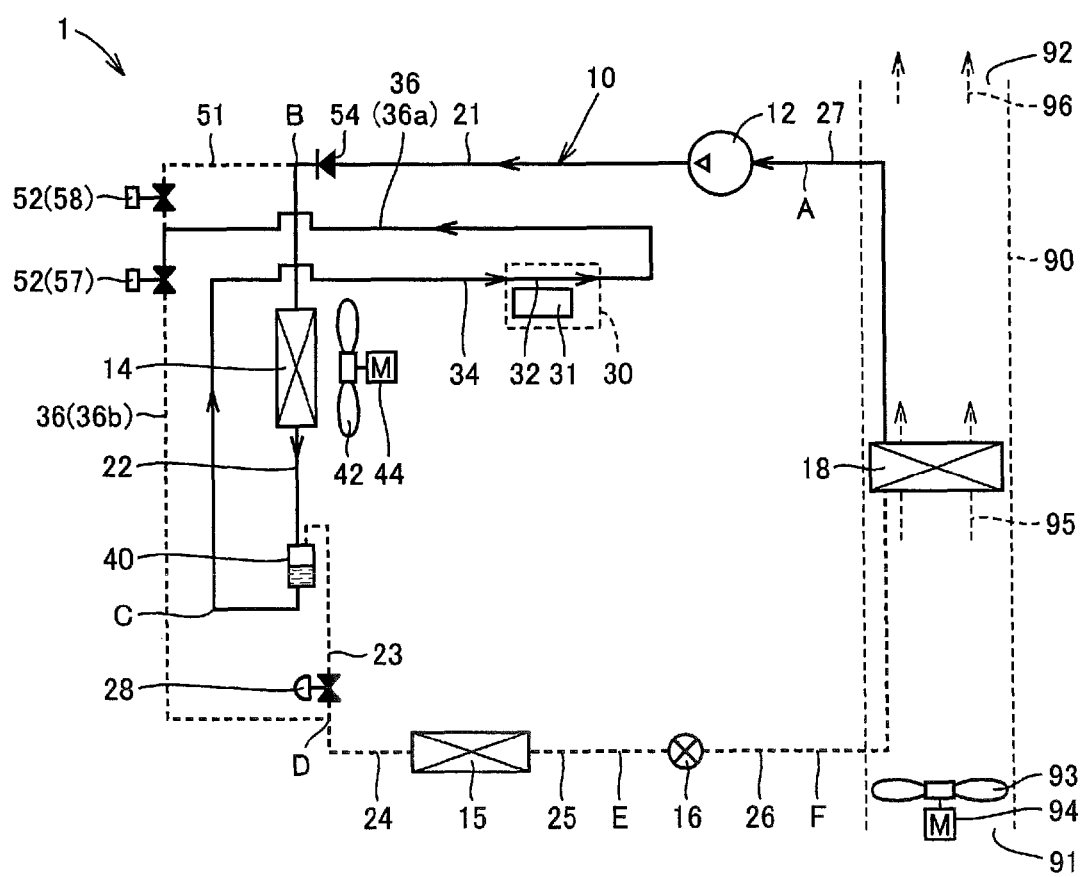
FIG. 9 is a schematic diagram showing the state of the cooling device after step (S20) shown in FIG. 8.

In this state, the coolant liquid adiabatically compressed in compressor 12 and condensed in heat exchanger 14 flows into gas-liquid separator 40, and this coolant liquid is continuously supplied to gas-liquid separator 40, but does not flow out of gas-liquid separator 40. Accordingly, the amount of the liquid coolant stored in gas-liquid separator 40 is to increase. It is to be noted that FIG. 9 is a schematic diagram showing the state of cooling device 1 after step (S20) shown in FIG. 8. The dotted line in FIG. 9 shows a route of the coolant passage through which the coolant does not flow.

Then, the rotation speed of condenser fan 42 is increased in step (S30). Signal M1 is transmitted from motor control unit 86 to motor 44, thereby increasing the rotation speed of motor 44. In accordance with this increase in rotation speed of motor 44, the rotation speed of condenser fan 42 coupled to motor 44 is also increased. Condenser fan 42 is rotated at a relatively higher speed, thereby increasing the air volume supplied from condenser fan 42 to heat exchanger 14. Accordingly, the amount of heat exchange in heat exchanger 14 between the coolant and the outside air is increased, thereby increasing the ability to cool the coolant in heat exchanger 14.

Consequently, since liquefaction of the coolant in heat exchanger 14 is promoted, the amount of the coolant in the liquid-phase state is increased at the outlet of heat exchanger 14. Typically, all the coolant is liquefied in heat exchanger 14, and the coolant flowing out of heat exchanger 14 and flowing through coolant passage 22 is in the saturated liquid state or supercooled liquid state. By improving the coolant cooling ability in heat exchanger 14, the amount of the coolant liquid stored in gas-liquid separator 40 can be increased more efficiently.

After continuously performing the operation of compressor 12 for a prescribed time period and increasing the amount of the liquid coolant in gas-liquid separator 40 in steps (S20) and (S30), compressor 12 is stopped in step (S40). Then in step (S50), open-close valve 58 is opened to set its opening degree at 100%, to form a route of the coolant flowing from cooling unit 30 through communication passage 51 into heat exchanger 14. Consequently, all settings of the devices for switching the operation mode of cooling device 1 are completed, and the operation mode of cooling device 1 is brought into a heat pipe operation mode shown in FIGS. 5 and 6. Open-close valve 58 is switched to be opened or closed, to complete switching of switching valve 52. Then, cooling of EV equipment 31 is started while compressor 12 is stopped, and the coolant circulates through the closed-loop route shown in FIG. 5.

As described above, cooling device 1 in the present embodiment can cool EV equipment 31 serving as a heat source in both of the "air-conditioner operation mode" in which compressor 12 is driven and the "heat pipe operation mode" in which compressor 12 is stopped. Since EV equipment 31 can be reliably cooled without having to start compressor 12 in the heat pipe operation mode, compressor 12 does not need to be continuously operated for cooling EV equipment 31. Accordingly, the power consumption of compressor 12 can be reduced to allow improvement in fuel efficiency of the vehicle and also allow extension of the operating life of compressor 12, so that the reliability of compressor 12 can be improved.

The opened or closed state of switching valve 52 is controlled in accordance with start or discontinuation of the operation of compressor 12 for switching the operation mode of cooling device 1. Thereby, switching between the air-conditioner operation mode and the heat pipe operation mode can be reliably performed, and the coolant can flow through an appropriate route for each operation mode.

The operation mode of cooling device 1 can be switched by the occupant of an electric vehicle manually operating a control panel to switch the air-conditioner to be turned ON/OFF. The operation mode of cooling device 1 is switched such that EV equipment 31 is cooled in the heat pipe operation mode by the vehicle occupant turning the air-conditioner OFF when the air conditioning within the vehicle cabin is not required. When the heat pipe operation mode is selected, compressor 12 is stopped. Accordingly, the operation time period of compressor 12 can be further shortened. Consequently, the effects of reducing the power consumption of compressor 12 and improving the reliability of compressor 12 can be achieved more remarkably.

The driving force for moving the coolant through the closed-loop coolant route forming a thermosyphon-type heat pipe includes only a gravitational force acting on the coolant in a liquid state, and a buoyant force acting on the coolant in a gaseous state. The driving force acting on the coolant becomes relatively smaller during the "heat pipe operation mode" than that during the "air-conditioner operation mode". It is particularly feared that, immediately after compressor 12 is stopped for switching the operation mode from the "air-conditioner operation mode" to the "heat pipe operation mode", the driving force for circulating the liquid coolant immediately declines, with the result that the coolant may not be supplied to cooling unit 31 but may gasify in cooling unit 30 to cause an insufficiently cooled state (a dried-out state) of HV equipment 31.

In cooling device 1 according to the present embodiment, by advantageously changing the order of switching of switching valve 52 and discontinuation of compressor 12, the operation of compressor 12 is continued in the state where both of open-close valve 57 and open-close valve 58 are fully closed, before forming a closed-loop coolant route. Compressor 12 applies driving force to the coolant, to cause the liquid coolant condensed in heat exchanger 14 to flow into gas-liquid separator 40, thereby increasing the amount of the liquid coolant within gas-liquid separator 40. When compressor 12 is stopped and the driving force of the coolant for cooling EV equipment 31 serving as a heat source is decreased, the coolant liquid flows from gas-liquid separator 40 through coolant passage 34. Thereby, the initial driving force of a loop-type heat pipe system is increased to suppress a decrease in the flow rate of the liquid-phase coolant supplied to cooling unit 30.

In this way, by supplementing the coolant circulation route with the coolant liquid stored in gas-liquid separator 40, the flow rate of the coolant in the liquid-phase state flowing into cooling unit 30 can be ensured. Accordingly, it becomes possible to suppress a decrease in cooling ability for EV equipment 31 at the start of the "heat pipe operation mode", and ensure the cooling performance for EV equipment 31, thereby allowing stable cooling of EV equipment 31. Therefore, since occurrence of the dried-out state can be suppressed or the dried-out state can be eliminated at an early stage even if it occurs, temperature rise in EV equipment 31 can be effectively suppressed.

By improving control of cooling device 1, the coolant can be continuously supplied to gas-liquid separator 40 for a prescribed time period (for example, for several seconds and the like, during which the coolant liquid within gas-liquid separator 40 can be sufficiently increased) before the flow of the coolant is changed, so that the liquid coolant can be accumulated in gas-liquid separator 40. There is no need to provide new components or devices for additionally supplying a liquid coolant to the closed-loop coolant route at the time when the operation mode is switched to the "heat pipe operation mode". Accordingly, it becomes possible to reliably maintain the cooling ability for EV equipment 31 at the time of switching the operation mode, and also possible to avoid an increase in cost and an increase in size of cooling device 1 that are caused by adding a structure to cooling device 1.

Second Embodiment

Figure 10:
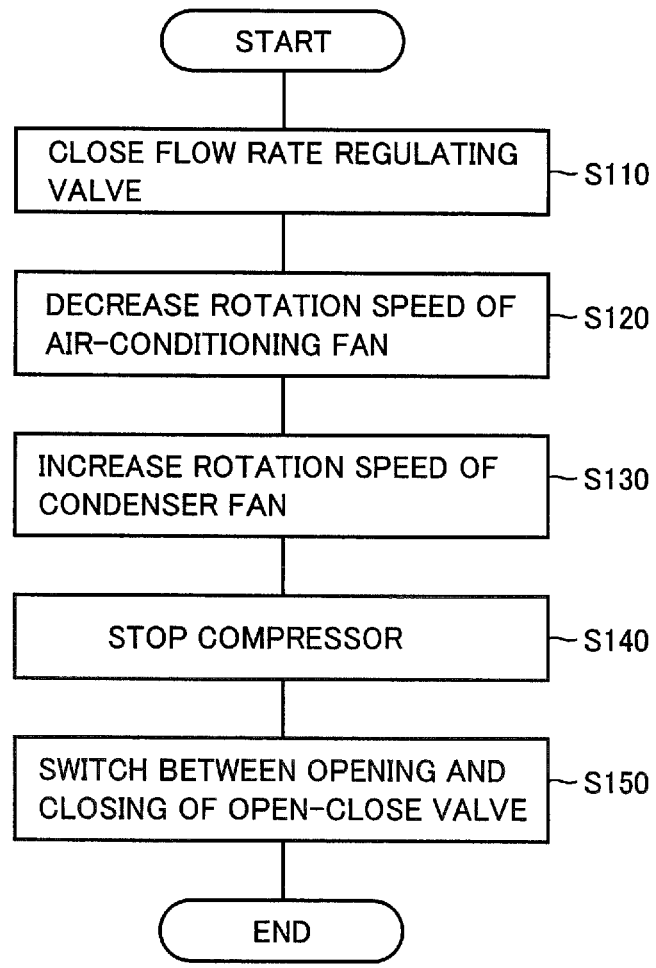
FIG. 10 is a flowchart illustrating another example of the method of controlling the cooling device.

FIG. 10 is a flowchart illustrating another example of a method of controlling cooling device 1. FIG. 10 shows another example of the control flow at the time when the operation mode of cooling device 1 is switched from the air-conditioner operation mode to the heat pipe operation mode.

As shown in FIG. 10, first in step (S110), flow rate regulating valve 28 is closed as in step (S10) of the first embodiment, to prevent the coolant from flowing through coolant passage 23.

Then in step (S120), the rotation speed of air-conditioning fan 93 is decreased. The rotation speed of motor 94 is decreased by transmitting signal M2 from motor control unit 86 to motor 94. In accordance with the decrease in rotation speed of motor 94, the rotation speed of air-conditioning fan 93 coupled to motor 94 is also decreased. By rotating air-conditioning fan 93 at a relatively lower speed or stopping air-conditioning fan 93, the air volume supplied from air-conditioning fan 93 to heat exchanger 18 is decreased. Accordingly, the amount of heat exchange in heat exchanger 18 between the coolant and the air-conditioning air is decreased to thereby suppress evaporation of the coolant in heat exchanger 18. When the ability to heat the coolant by heat exchanger 18 is decreased, the superheat degree of the coolant flowing out of heat exchanger 18 is decreased.

As expansion valve 16, a thermal expansion valve is used that is available at low cost and does not require a control circuit. Expansion valve 16 senses the temperature of the coolant at the outlet of heat exchanger 18, and automatically changes the opening degree in accordance with the temperature of the coolant. The temperature rise of the coolant in heat exchanger 18 is suppressed to lower the superheat degree of the coolant at the outlet of heat exchanger 18, thereby relatively lowering the temperature of the coolant. In accordance with this, the opening degree of expansion valve 16 is automatically decreased, so that the flow rate of the coolant flowing through expansion valve 16 is decreased. Typically, the valve opening degree of expansion valve 16 is decreased to 0%, thereby blocking the flow of the coolant through expansion valve 16. In other words, in step (S120), the rotation speed of air-conditioning fan 93 is decreased to thereby decrease the opening degree of expansion valve 16.

Figure 11:
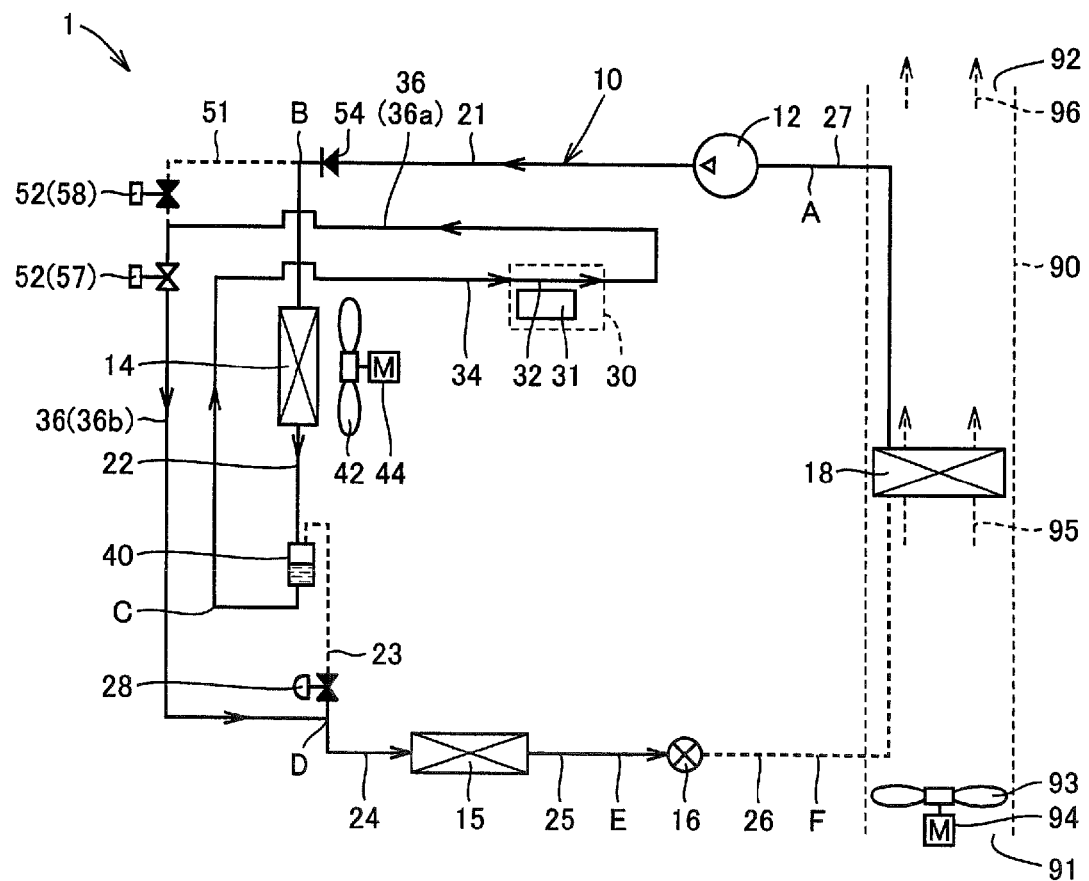
FIG. 11 is a schematic diagram showing the state of the cooling device after step (S120) shown in FIG. 10.

FIG. 11 is a schematic diagram showing the state of cooling device 1 after step (S120) shown in FIG. 10. The dotted line in FIG. 11 shows a route of the coolant passages through which the coolant does not flow. The opening degree of expansion valve 16 is decreased, and typically, the opening degree of expansion valve 16 reaches 0%, with the result that the flow of the coolant flowing through expansion valve 16 toward heat exchanger 18 is stopped. Since compressor 12 continuously operates at this time, the amount of the liquid coolant stored in gas-liquid separator 40 is to increase. Also in this state, the coolant subjected to heat exchange in cooling unit 30 is allowed to flow into heat exchanger 15, and the coolant heated and partially evaporated in cooling unit 30 is condensed again in heat exchanger 15 and then liquefies.

Then in step (S130), the rotation speed of condenser fan 42 is increased. The rotation speed of motor 44 is increased to rotate condenser fan 42 coupled to motor 44 at a relatively higher rotation speed, thereby increasing the air volume supplied from condenser fan 42 to heat exchanger 14. Accordingly, since liquefaction of the coolant in heat exchanger 14 is promoted, the amount of the coolant in the liquid-phase state increases at the outlet of heat exchanger 14. By improving the ability to cool the coolant in heat exchanger 14, the amount of the coolant liquid stored in gas-liquid separator 40 can be increased more efficiently.

After the operation of compressor 12 is continued for a prescribed time period to increase the amount of the liquid coolant in gas-liquid separator 40 in steps (S120) and (S130), compressor 12 is then stopped in step (S140). Then in step (S150), the setting for opening or closing switching valve 52 is changed. Specifically, open-close valve 57 is closed to set its opening degree at 0% while open-close valve 58 is opened to set its opening degree at 100%. Thereby, all settings for devices for switching the operation mode of cooling device 1 are completed, and the operation mode of cooling device 1 is brought into a heat pipe operation mode shown in FIGS. 5 and 6. When switching between opening and closing of each of open-close valves 57 and 58 is completed, cooling of EV equipment 31 is started while compressor 12 is stopped. Then, the coolant is circulated through the closed-loop route shown in FIG. 5.

According to cooling device 1 in the second embodiment, as in the first embodiment, compressor 12 is continuously operated to increase the amount of the liquid coolant in gas-liquid separator 40, before forming a closed-loop coolant route. When compressor 12 is stopped, coolant liquid is supplemented from gas-liquid separator 40 through coolant passage 34, so that the flow rate of the coolant in the liquid-phase state flowing into cooling unit 30 can be ensured. Accordingly, it becomes possible to suppress a decrease in cooling ability for EV equipment 31 at the start of the "heat pipe operation mode" to thereby ensure the cooling performance for EV equipment 31, so that EV equipment 31 can be cooled with stability. Therefore, since occurrence of the dried-out state can be suppressed, or the dried-out state can be eliminated at an early stage even if it occurs, a temperature rise in EV equipment 31 can be suppressed effectively.

In the case where the operation of compressor 12 is continued for a prescribed time period while open-close valves 57 and 58 each are fully closed as described in the first embodiment, if the amount of heat generated from EV equipment 31 is relatively large, the coolant heated and evaporated in cooling unit 30 is to be accumulated in cooling unit 30. In cooling unit 30, EV equipment 31 is cooled utilizing the latent heat caused when the coolant in the saturated liquid state evaporates. Accordingly, when cooling unit 30 is filled with a gas coolant, a dried-out state occurs, thereby significantly decreasing the amount of heat transferred from EV equipment 31 to the coolant. Consequently, cooling of EV equipment 31 may be insufficient.

In contrast, according to cooling device 1 in the second embodiment, since the gas coolant generated within cooling unit 30 can be liquefied in heat exchanger 15, accumulation of coolant vapor in cooling unit 30 can be suppressed. Therefore, insufficient cooling of EV equipment 31 can be avoided, so that the cooling ability for EV equipment 31 can be further more reliably ensured. In the case where the amount of heat generated from the heat source is relatively large due to the running state of the vehicle or due to the type of devices to be cooled in cooling unit 30, the heat source can be further more reliably cooled by cooling the heat source by means of control in the second embodiment. When the rotation speed of the fan supplying cooling air to heat exchanger 15 is changed, the ability to cool the coolant in heat exchanger 15 can be improved, so that the cooling ability for EV equipment 31 can be much more reliably ensured.

Although the embodiments according to the present invention have been described as above, the configurations of the embodiments may be combined as appropriate. It should be construed that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The method of controlling a cooling device according to the present invention may be particularly advantageously applied to control of a cooling device for cooling an electrical device by using a vapor compression refrigeration cycle for cooling a vehicle cabin in a vehicle such as an electric vehicle equipped with electrical devices such as a motor generator and an inverter.

REFERENCE SIGNS LIST 1 cooling device, 10 vapor compression refrigeration cycle, 12 compressor, 14, 15, 18 heat exchanger, 16 expansion valve, 21, 22, 23, 24, 25, 26, 27, 34, 36, 36a, 36b coolant passage, 28 flow rate regulating valve, 30 cooling unit, 31 EV equipment, 32 cooling passage, 40 gas-liquid separator, 42 condenser fan, 44, 94 motor, 51 communication passage, 52 switching valve, 54 check valve, 57, 58 open-close valve, 60 ground surface, 80 control unit, 93 air-conditioning fan.

The invention claimed is:

1. A method of controlling a cooling device cooling a heat source,
the cooling device including:
a compressor configured to circulate a coolant,
a heat exchanger configured to perform heat exchange between the coolant and outside air,
a cooling unit configured to cool the heat source using the coolant,
a liquid storage container configured to store coolant in a liquid state condensed by the heat exchanger,
a first passage through which the coolant discharged from the compressor flows into the cooling unit through the heat exchanger and the liquid storage container,
a second passage through which the coolant circulates between the heat exchanger and the cooling unit by a force of gravity without applying motive power when the compressor stops, and
a switching valve structure switching between communication of the first passage and communication of the second passage, the switching valve structure including: (i) a first open-close valve switching between communication of the first passage and blocking of the first passage, and (ii) a second open-close valve switching between communication of the second passage and blocking of the second passage; and
the method comprising the steps of:
blocking the first passage from a state of allowing communication of the first passage and blocking the second passage;
after the step of blocking the first passage, increasing an amount of the coolant in the liquid state stored in the liquid storage container; and
after the step of increasing an amount of the coolant, allowing communication of the second passage while maintaining blocking of the first passage.

2. The method of controlling the cooling device according to claim 1, wherein
the step of blocking the first passage includes a step of closing the first open-close valve, and
the step of allowing communication of the second passage includes a step of opening the second open-close valve.

3. The method of controlling the cooling device according to claim 2, wherein
the cooling device includes an outside-air supplying fan for supplying the outside air to the heat exchanger, and
the step of increasing an amount of the coolant includes a step of increasing a rotation speed of the outside-air supplying fan.

4. The method of controlling the cooling device according to claim 1, wherein the cooling device further includes an expansion valve decompressing the coolant, and a second heat exchanger performing heat exchange between the coolant decompressed by the expansion valve and air-conditioning air, and
the step of blocking the first passage includes a step of decreasing an opening degree of the expansion valve.

5. The method of controlling the cooling device according to claim 4, wherein
the expansion valve is a thermal expansion valve,
the cooling device further includes an air-conditioning fan for supplying the air-conditioning air to the second heat exchanger, and
the step of decreasing an opening degree includes a step of decreasing a rotation speed of said air-conditioning fan.

6. The method of controlling the cooling device according to claim 4, wherein the cooling device includes a third heat exchanger provided between the heat exchanger and the expansion valve, the third heat exchanger performing heat exchange between the coolant and outside air.

7. The method of controlling the cooling device according to claim 4, wherein
the cooling device includes an outside-air supplying fan for supplying the outside air to the heat exchanger, and
the step of increasing an amount of the coolant includes a step of increasing a rotation speed of the outside-air supplying fan.

8. The method of controlling the cooling device according to claim 5, wherein the cooling device further includes a third heat exchanger provided between the heat exchanger and the expansion valve, the third heat exchanger performing heat exchange between the coolant and outside air.

9. The method of controlling the cooling device according to claim 5, wherein
the cooling device includes an outside-air supplying fan for supplying the outside air to the heat exchanger, and
the step of increasing an amount of the coolant includes a step of increasing a rotation speed of the outside-air supplying fan.

10. The method of controlling the cooling device according to claim 8, wherein
the cooling device includes an outside-air supplying fan for supplying the outside air to the heat exchanger, and
the step of increasing an amount of the coolant includes a step of increasing a rotation speed of the outside-air supplying fan.

11. The method of controlling the cooling device according to claim 6, wherein
the cooling device includes an outside-air supplying fan for supplying the outside air to the heat exchanger, and
the step of increasing an amount of the coolant includes a step of increasing a rotation speed of the outside-air supplying fan.

12. The method of controlling the cooling device according to claim 1, wherein
the cooling device includes an outside-air supplying fan for supplying the outside air to the heat exchanger, and
the step of increasing an amount of the coolant includes a step of increasing a rotation speed of the outside-air supplying fan.

* * * * *